UNITED STATES PATENT OFFICE.

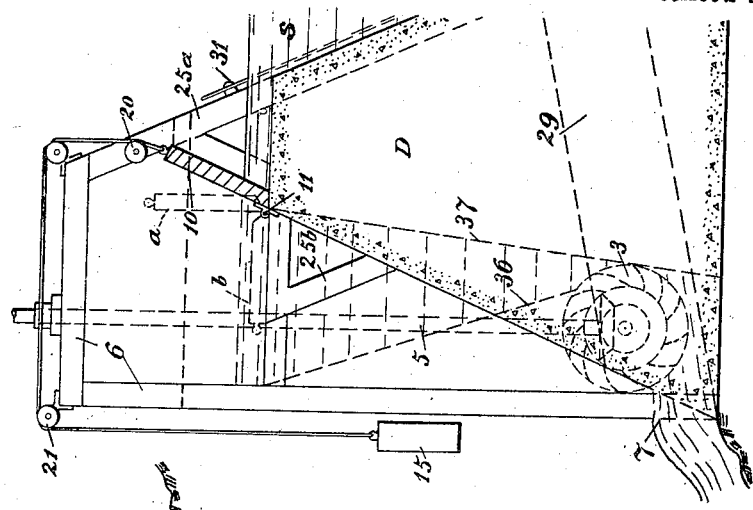
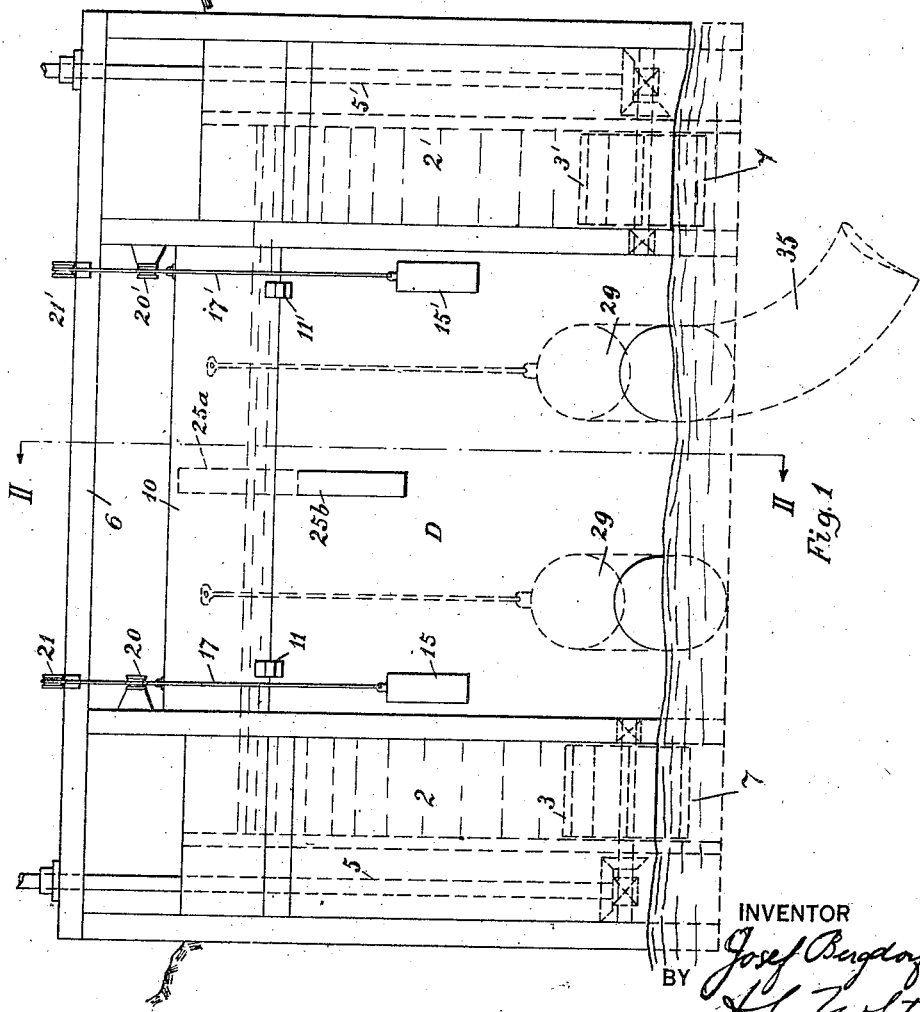

JOSEF BERGDORF, OF NEW YORK, N. Y.

HYDRAULIC WATER GATE.

1,405,390.  Specification of Letters Patent.  Patented Feb. 7, 1922.

Application filed October 29, 1920. Serial No. 420,351.

*To all whom it may concern:*

Be it known that I, JOSEF BERGDORF, a citizen of the German Republic, residing in New York, county of New York, and State of New York, have invented certain new and useful Improvements in Hydraulic Water Gates, of which the following is a specification.

This invention relates to hydraulic power plants and has for its primary object to unite into a unitary structure, both a dam and a power plant, and to provide apparatus whereby the head of water is regulated automatically. It is particularly applicable for use in small rivers and mountain streams, but it is to be understood that its application is not thus limited.

Various other features and objects of the invention will appear in the appended detailed description of a specific form of embodiment thereof illustrated in the accompanying drawing, in which—

Figure 1 shows an elevation of one form of structure embodying the invention, and Figure 2, a cross-section of Figure 1 on line II—II looking in the direction of the arrows.

Similar characters of reference designate similar parts in both of the views.

Reference letter D designates a dam erected across the bed of a stream S. This dam may be of concrete, as indicated in the drawing, or of any other suitable material, as will be readily understood by those versed in the art. At the ends of the dam are provided pits 2 and 2' for receiving hydraulic turbines diagrammatically indicated at 3 and 3', which turbines are connected by bevel gearing with vertical shafts 5 and 5'. These shafts extend upwardly from the pit and serve to drive electrical generators, mills or other machinery not shown in the drawing, and which may be mounted on the structure 6 located on top of the dam. The walls of the wheel pits converge toward the bottom, as indicated at 36 and 37, Fig. 2, so that the water which enters the pits adjacent the top traverses and drives the turbines 3 and 3'. Thereafter it is discharged on the lower side of the dam through the openings 7 and 7'. Where desired, types of hydraulic turbines other than those indicated may be employed, it being understood that the invention is not limited to the particular forms thereof indicated.

To regulate the head of water on the turbines, I provide a member 10 which is hinged at 11 to the dam D, and which member extends part way across the stream, as shown in Figure 1. Counterweights 15 and 15' are connected by cables 17 and 17' to the upper edge of the member 10. This cable passes over wheels 20, 20' and 21, 21', which wheels are affixed to the side walls of the structures 6 and 6', the positions of the wheels 21 and 21' being such that the counterweights are free to move vertically and the positions of wheels 20 and 20' being such that with the normal head of water on the dam, the member 10 rests on the stop 25$^a$ as illustrated in the drawing. When the level of the water rises due to a flood or other occurrence, the additional pressure of the water on the member 10 causes the same to swing through a small angle backward, i. e., counter clockwise in Figure 2, to a position such that the added pressure of the water is counterbalanced by the increased moment of weights 15 and 15' on member 10. As the water level continues to rise the member 10 will approach a position at which the moment of the weights is a maximum, this position being substantially vertical as indicated at ($a$) in the drawing. Any further increase of the water level will cause the member 10 to swing into the position indicated at ($b$) where it is supported by a stop 25$^b$. The water on the upper side of the dam is now free to flow to the lower side without passing through the turbines and the head of water is thus reduced. As soon as a designated minimum is reached the weights cause the member 10 to return to its initial position. This member serves, therefore, as an automatic regulator of the water level so that the turbine is operated under a substantially constant head.

Passages, such as 29, may be provided for permitting the water above the dam to be drawn off when desired, these passage-ways being controlled by valves, not shown, operated from mechanism 31 at the upper surface of the dam. The passage-ways may serve also for leading water to turbines or other hydraulic motors located at a distance from the dam, in which case a conduit, such as 35, communicating with one of the passage-ways 29, as shown in Figure 1, is provided to lead the water to such distant turbine.

Although I have shown and described herein only one specific form of embodiment of the invention, it is readily understood that various changes and modifications may be made therein without departing from the spirit and scope of the invention, as defined by the appended claims.

What I claim is:

1. An automatic regulator for the height of a water level comprising a flow obstructing member, means for pivotally mounting said member at its lower edge, and means for normally maintaining said member in a position inclined in the direction opposed to the direction of flow of the water, said member being capable of moving from said position to a horizontal collapsed position with the direction of flow, said last named means comprising a weight and pulley mechanism and tension means attached to the said member passed over said pulley and attached to the said weight, the said pulley being placed over and in line with the normal position of the said member, whereby the torque exerted by said mechanism on said member increases to a maximum and decreases during the movement of said member from its normal to its collapsed position.

2. An automatic regulator for the height of a water level comprising a flow obstructing member, means for maintaining said member in a position inclined to the direction of flow of the water, and means for supporting said member in a collapsed position, said member being capable of assuming any intermediate position, said first mentioned means exerting a torque on said member, which reaches its maximum at an intermediate position of the member.

3. In an automatic regulator for the height of a water level, a flow obstructing member, means for pivotally mounting said member at its lower edge, pulley and weight mechanism for exerting a turning moment on said member and for normally maintaining said member in a position inclined in the direction of flow of the water, one of the pulleys of said mechanism being placed in line with and over the normal position of said member, and tension means attached to the said member, passed over the said pulley and attached to the weight, whereby a maximum moment is created on said member when the same is in its vertical position.

In testimony whereof I have affixed my signature to this specification.

JOSEF BERGDORF.